(12) United States Patent
Tamai et al.

(10) Patent No.: US 7,032,393 B2
(45) Date of Patent: Apr. 25, 2006

(54) CLIMATE COOLING CONTROL SYSTEMS AND METHODS FOR HYBRID VEHICLES

(75) Inventors: Goro Tamai, West Bloomfield, MI (US); William L. Aldrich, III, Davisburg, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/650,210

(22) Filed: Aug. 28, 2003

(65) Prior Publication Data

US 2005/0044873 A1    Mar. 3, 2005

(51) Int. Cl.
*B60H 1/32* (2006.01)

(52) U.S. Cl. ............................ 62/115; 62/130; 62/244; 62/323.4

(58) Field of Classification Search ................. 62/236, 62/244, 323.1, 323.3, 323.4, 125–131
See application file for complete search history.

(56) References Cited

U.S. PATENT DOCUMENTS

| | | | | |
|---|---|---|---|---|
| 3,789,618 A | * | 2/1974 | Feliz | 62/236 |
| 5,904,052 A | * | 5/1999 | Inoue et al. | 62/244 |
| 6,375,436 B1 | * | 4/2002 | Irie et al. | 417/223 |
| 6,516,621 B1 | * | 2/2003 | Homan et al. | 62/133 |
| 6,543,243 B1 | * | 4/2003 | Mohrmann et al. | 62/230 |
| 6,606,877 B1 | * | 8/2003 | Tomita et al. | 62/244 |
| 6,675,597 B1 | * | 1/2004 | Ieda et al. | 62/244 |
| 6,688,120 B1 | * | 2/2004 | Aoki et al. | 62/133 |
| 6,708,512 B1 | * | 3/2004 | Kitamura et al. | 62/227 |
| 6,755,033 B1 | * | 6/2004 | Iwanami et al. | 62/133 |

* cited by examiner

*Primary Examiner*—William E. Tapolcai
(74) *Attorney, Agent, or Firm*—Christopher DeVries

(57) ABSTRACT

Methods and apparatus are provided for controlling the climate cooling in the passenger cabin of a hybrid motor vehicle. The apparatus includes an internal combustion engine capable of being started and temporarily stopped, an air conditioning compressor and a dedicated electric compressor motor coupled to drive the air conditioning compressor. Moreover, sensors are coupled to monitor selected parameters associated with the motor vehicle. An electronic controller is coupled to the internal combustion engine, the compressor motor and the sensors. The engine when running operates the compressor to provide cabin climate cooling. The controller responds to the selected parameters to selectively drive the compressor motor to selectively drive the compressor when the engine is temporarily stopped so that the climate cooling continues to be supplied to the cabin if certain monitored conditions are met. The controller terminates the operation of the compressor motor when the engine is restarted and the engine then again drives the compressor.

4 Claims, 4 Drawing Sheets

CLIMATE COOLING CONTROL SYSTEMS AND METHODS FOR HYBRID VEHICLES

TECHNICAL FIELD

This invention relates generally to motor vehicle climate cooling control systems and methods, and more specifically to such systems and methods for use in hybrid electric vehicles.

BACKGROUND

The need to reduce fuel consumption and engine exhaust emissions from vehicles powered by internal combustion engines is well known. Hybrid gasoline-electric vehicles achieve high fuel efficiency and low emissions by combining highly efficient internal combustion gasoline engines with electric motors. Although the mechanical means by which the electric motors and gasoline engines are coupled to the drive trains varies between vehicle manufacturers, hybrid electric vehicles utilize both the gasoline engines and the electric motors to power the driving wheels to some extent. The engine control system of a hybrid vehicle varies the amount of drive power from the electric motor and the gasoline engine depending on the necessary power output and the driving conditions, selecting the most efficient method of powering the vehicle for the situation at hand.

In general, minimizing the use of the gasoline engine of a hybrid vehicle at inefficient periods such as when the vehicle is temporarily stopped enhances fuel efficiency. Such vehicles increase their fuel efficiency by shutting off the gasoline engine at extended stops, such as at stop signs or stoplights and then restarting the gasoline engine when it is desired to propel the vehicle. This is known as an Engine Stop Start (ESS) function. When the gasoline engine is off, auxiliary systems such as the radio, gauges, power windows, and the like are kept operative by a low voltage (usually 12 volt) electrical system. When the stoplight changes or when it is otherwise safe to proceed, in response to the brake pedal being released and/or the accelerator pedal being depressed, the gasoline engine is immediately restarted and the vehicle can drive off.

Such ESS operation is beneficial in reducing fuel use and emissions but makes operation of a conventional climate cooling system difficult. The passenger cabin air conditioning system does not work without some kind of power input. The compressor that powers the Air Conditioning (A/C) system is generally driven by the crankshaft of the gasoline engine, and therefore is inoperative when the gasoline engine is shut off at the stoplights or stop signs, for instance. Without the compressor running, pressure differentials within the A/C system, that are necessary for the A/C system to function, quickly decrease, eliminating the cooling ability thereof. Without the cooling ability of the A/C system, the air circulating through the passenger cabin increases in temperature and quickly becomes uncomfortably warm if the ambient temperature outside of the vehicle is high. In addition, after a few seconds, the cabin air might also begin to have a musty smell because moisture is no longer being removed from the cabin air by the compressor to the extent it was being removed when the compressor was running.

Conventional hybrid electric vehicles deal with the forgoing ESS climate cooling control problem in a number of ways. One method is to simply take no action. When the vehicle arrives at a stop sign or stoplight, the gasoline engine is turned off, and the vehicle provides the occupants of the passenger cabin with no additional cooling until the gasoline engine is again started. This approach is economical, but will lead to uncomfortable conditions for the vehicle passengers when the ambient temperature of the vehicle is high. Another approach to the ESS climate cooling control problem is to keep the gasoline engine running at stoplights or stop signs when A/C is requested. Keeping the engine running allows the climate cooling system to continue providing the passenger cabin with cooling, but contributes nothing to fuel efficiency or emission reduction when A/C is required because the gasoline engine is still operating and consuming fuel. Hence, this approach undesirably sacrifices fuel efficiency for passenger comfort.

Another prior art solution to the ESS climate cooling control problem proposes the addition of a dedicated electrical motor as the sole power source for driving the A/C compressor. Unfortunately, since this system has to be able to provide the entire passenger cabin cooling, even on very hot days, it requires a high power (numerous kilowatts (kW)) motor and costly electronics such as an expensive power-inverter system. In addition, the expensive high power, dedicated electric motor adds undesired mass to the vehicle.

Still another approach to dealing with the ESS problem is employed by some "mild" gasoline-electric hybrid vehicles that have a combined electric starter motor and generator/alternator (MoGen) that supports the hybrid and ESS functionality. The MoGen replaces the conventional starter motor and alternator with one unit that performs both functions. The MoGen system is implemented to enable the fuel-cut off feature while minimally affecting "driveability". When the vehicle is decelerating or is stopped, the fuel flow to the engine is stopped by the ESS system. In a mild hybrid vehicle having a powertrain with an automatic transmission, after the vehicle engine has been temporarily shut down, then either after the passage of a selected amount of time or a brake-pedal release the MoGen spins up and restarts the gasoline engine. If it is desired for the vehicle to start going from a stop, the spin up of the engine can "creep" the vehicle forward similar to the action of the automatic transmission of a conventional vehicle while the engine is being restarted. When the engine is running the MoGen acts as a generator or alternator to supply the vehicle's electrical power requirements and to recharge the batteries.

In some prior art systems the MoGen unit is typically belted to the crankshaft pulley of the engine so that it can perform the engine start or automatic restart, vehicle creep and charging functions. If the crankshaft pulley is clutched to the gasoline engine crankshaft, the associated belt driven components can be driven by the MoGen electric motor when the engine is in the temporarily shutoff state without driving the engine. Specifically, a mild hybrid system has been utilized in which the crankshaft pulley is de-clutched from the crankshaft allowing the MoGen to utilize battery-supplied power to turn the entire accessory drive system independent of the engine. However, the accessory drive system can also include the hydraulic power steering pump, water pump, and an array of idler pulleys in addition to the A/C compressor. The operation of the compressor allows the passenger compartment to continue to receive cooling airflow with the engine temporarily shutoff; however, the maximum fuel efficiency of the mild hybrid vehicle is compromised because of the large amount of battery energy that is expended spinning the other accessory drive system components. The MoGen must replenish this battery energy at some later time when the engine is running. This replenishment can provide an undesirably high load on the engine. It is desirable to maintain both fuel efficiency and passenger comfort. Thus this approach again sacrifices fuel efficiency for passenger comfort. In addition, this approach requires complicated clutch/drive mechanisms, which increase vehicle cost and whose failure modes could affect the base-engine hardware functions.

In view of the foregoing, it should be appreciated that there is a need to provide methods and apparatus for providing simple, efficient and economical motor vehicle passenger cabin climate cooling control systems and methods for use in hybrid and mild hybrid electric vehicles. Such systems and methods should also minimize the parts count and parts mass required for powering the A/C compressor when the engine is temporarily inoperative because of ESS operation, for instance. Moreover, such systems and methods should ensure that the vehicle driveability is consistent, predictable and pleasing to the customer while maintaining fuel efficiency and emissions reductions.

Furthermore, other desirable features and characteristics of the present invention will become apparent from the subsequent detailed description, brief summary, abstract, and appended claims, taken in conjunction with the accompanying drawings and the foregoing technical field and background.

BRIEF SUMMARY

In accordance with an exemplary embodiment of the present invention, an apparatus is provided for controlling the climate cooling in the passenger cabin of a motor vehicle. The apparatus includes an internal combustion engine capable of being started and temporarily shut off, an air conditioning compressor selectively coupled to the internal combustion engine through a clutch and an additional compressor drive motor that is coupled to the air conditioning compressor. The compressor drive motor is controlled to selectively operate the compressor in conjunction with operation of the clutch. Moreover, sensors are coupled to monitor selected parameters associated with the motor vehicle. An electronic controller is coupled to the internal combustion engine, clutch, compressor drive motor and the sensors. The controller is configured to selectively start and temporarily stop the operation of the engine. The controller also responds to the selected parameters monitored by the sensors to selectively operate the compressor drive motor and the clutch to thereby selectively operate the compressor when the engine is temporarily stopped so that the climate cooling continues to be supplied to the passenger cabin.

In accordance with another exemplary embodiment of the present invention, a method is provided for providing the climate cooling to the passenger cabin of the motor vehicle having an internal combustion engine that is selectively started and temporarily stopped. The method comprises a step of sensing selected parameters associated with the motor vehicle. The method also includes a step of responding to the selected parameters to selectively operate the compressor drive motor. The motor selectively operates the compressor when the engine is temporarily stopped so that the climate cooling continues to be supplied to the passenger cabin while the engine is temporarily stopped.

BRIEF DESCRIPTION OF THE DRAWINGS

The present invention will hereinafter be described in conjunction with the appended drawing figures, wherein like reference numbers denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
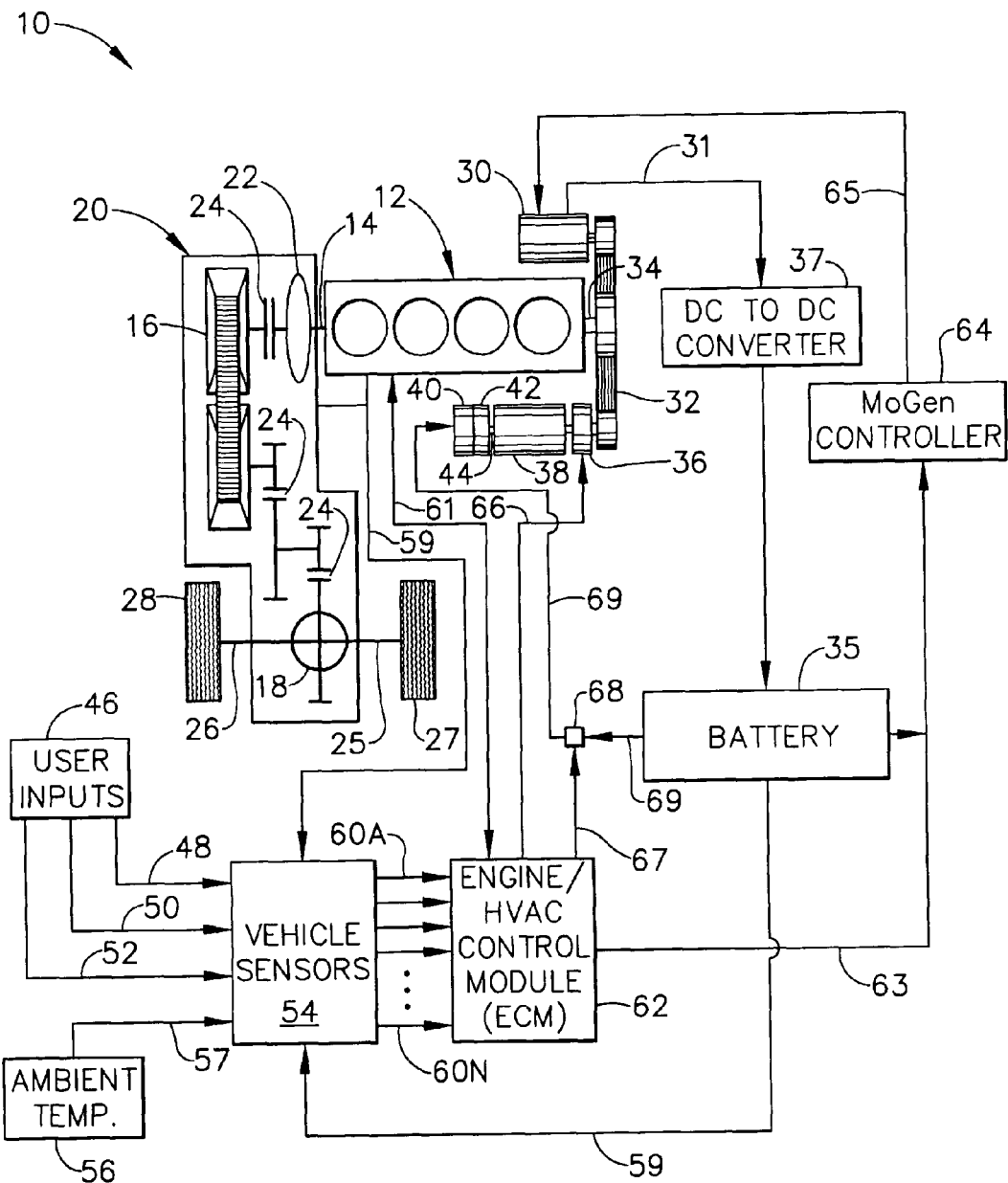
FIG. 1 is a diagrammatic view of a mild hybrid vehicle drive train having an apparatus for providing passenger cabin climate cooling in accordance with an exemplary embodiment of the present invention.

Referring to FIG. 1, a drive train system 10 for a mild hybrid vehicle is illustrated that includes an internal combustion engine 12 which is coupled through a rear drive shaft 14 to a variable speed transmission 16 and a differential 18. Engine 12 can be a four-cycle gasoline engine that is adaptable to serve many purposes such as powering an automobile, a boat, an airplane or an electrical generator, for instance. In addition, engine 12 can have any number of cylinders, N where N is equal to or greater than one. The transmission 16 and differential 18 are enclosed by block 20. In addition, a torque converter 22 and various clutches 24 are included in block 20. Differential 18 is connected to a drive mechanism, which can have any number of drive configurations. For example, the drive mechanism of system 10 has axles 25 and 26 that are respectively connected to a first drive wheel 27 and a second drive wheel 28 that form a pair of drive wheels for propelling the vehicle.

The hybrid drive system 10 further includes a motor-generator/alternator (MoGen) 30, which generally operates as previously described in the foregoing "Background" portion of this specification. Specifically, MoGen 30 is directly connected by a direct belt or chain drive 32 to crankshaft 34 at the front end of engine 12. Briefly, MoGen 30 operates as starting motor to start engine 12 and then as an alternator to satisfy the electrical needs of system 10 when engine 12 is running. MoGen 30 can utilize belt 32 to creep the vehicle forward while turning engine 12 and to start engine 12 when the MoGen 30 is in its starter motor mode and when the driver has indicated that the vehicle is to begin accelerating from a stop. Power conductor 31 couples MoGen 30 and a battery bank 35 through a suitable DC-to-DC converter 37 so that MoGen 30 can charge the battery bank 35 while engine 12 is running and when MoGen 30 is in its generator or alternator mode. In addition, conductor 31 allows battery bank 35 to provide electrical power to operate MoGen 30 in the starter motor mode.

A front clutch or mechanical coupler 36 at the front of an A/C compressor 38 selectively couples the A/C compressor 38 to engine crankshaft 34 through the belt or chain drive 32. A compressor electric drive motor 40 is located at the rear of A/C compressor 38. Motor 40 is coupled through a one-way/free wheeling, rear clutch or mechanical coupler 42 to A/C compressor shaft 44. Clutch 42 enables electric motor 40 to drive A/C compressor 38 when conditions to be described are met so that compressor 38 can enable the A/C system to provide cooling to the passenger cabin during selected times when engine 12 is inoperative. In addition, when electric motor 40 is not operative, rear clutch 42 in conjunction with front clutch 36 enables compressor 38 to be driven by engine 12 through belt 32 without back-driving motor 40 thus reducing friction losses otherwise occurring. The complete A/C system and the passenger cabin are well known in the art and thus they are not shown to simplify FIG. 1.

The driver and/or passenger of the motor vehicle that includes system 10 provides "User" inputs 46. Such user inputs provided by the driver include the accelerator pedal position of line 48 and the brake pedal position of line 50. Other user inputs that can be provided by either the driver or passenger include the Heater, Ventilation and Air Conditioning (HVAC) manual control positions of line 52. These user inputs are sensed by some of the plurality of vehicle sensors represented by block 54 and converted to electrical signals in a known manner. Other sensors can include a sensor for inputting vehicle ambient temperature 56 on line 57 and a battery state of charge (SOC) sensor that is coupled to rechargeable battery bank 35 by line 59. Other types of known energy storage could be used in place of battery bank 35 to drive compressor motor 40 such as a hydraulic accumulator, etc. but for the purposes of this discussion, battery bank 35 is assumed to provide such energy storage. The foregoing and other sensor outputs 60A through 60N are provided by block 54 to a HVAC and Engine Control Module (ECM) 62 that can be of a known type. Such other sensor inputs can include, for example, known sensors for monitoring other parameters and for providing data on line 59 related to engine speed, transmission state, vehicle speed and intake manifold air pressure.

ECM 62 can be microprocessor based and include a central processing unit or units connected to various RAM and ROM memories. ECM 62 executes various interrupt software routines to provide air, fuel and spark control on line or cable 61 for engine 12. Such control is provided in response to sensor outputs 60A through 60N. ECM 62 also provides signals on conductor 63 to MoGen controller 64 that is connected to MoGen 30 by conductor 65. Furthermore, ECM 62 performs HVAC software control routines such as Hybrid Cooling Control System (HCCS) method 70 of FIGS. 2a and 2b, in accordance with one embodiment of the invention. Hybrid powertrain system 10 utilizes an ESS function that is programmed into ECM 62 to provide fuel economy and emission reduction. As mentioned above, the ESS function selectively shuts down engine 12 when the vehicle is stopped and utilizes MoGen 64 to restart the engine when it is desired move the vehicle.

When the driver or a passenger requests cooling an "A/C On" signal is provided from user input block 46 on line 52 to a sensor in block 54. As will be more particularly described with respect to HCCS method 70 of FIGS. 2a and 2b, when the engine stop command of the ESS system occurs, ECM 62 selectively disengages front compressor clutch 36 by providing a control signal thereto on conductor 66. Clutch 36 then operates to de-couple the A/C compressor 38 from drive belt 32. ECM 62 then can provide another control signal through conductor 67 that operates a compressor motor control system that includes controllable switch or relay 68. Switch 68 enables battery bank 35 to apply power to activate drive motor 40 through a power conductor cable 69 by selectively connecting battery 35 to motor 40. Rear compressor clutch 42 automatically mechanically couples motor 40 to drive A/C compressor 38 in response to the activation of motor 40. Clutch 42 also automatically de-couples compressor 38 from motor 40 in response to the deactivation of motor 40 by ECM 62. Thus A/C compressor 38, when driven by motor 40, enables cool air to be provided by the A/C system which cools the passenger cabin even though the ESS function has turned off engine 12. In accordance with an aspect of another embodiment of the invention, a method is provided for selectively operating motor 40 only under predetermined conditions that are based on selected parameters being in predetermined ranges. This method enables motor 40 to be smaller, lighter in weight and less expensive than if motor 40 was not selectively operated by the HCCS system. This is because motor 40 otherwise would have to be capable of operating compressor 38 to provide all of the cabin cooling requirements whenever engine 12 is temporarily disabled. When the ESS function initiates the start of engine 12 then motor 40 is disabled and ECM 62 provides a signal to front clutch 36 which couples the A/C compressor 38 to belt 32 so that engine 12 can again operate compressor 38.

Figure 2A:
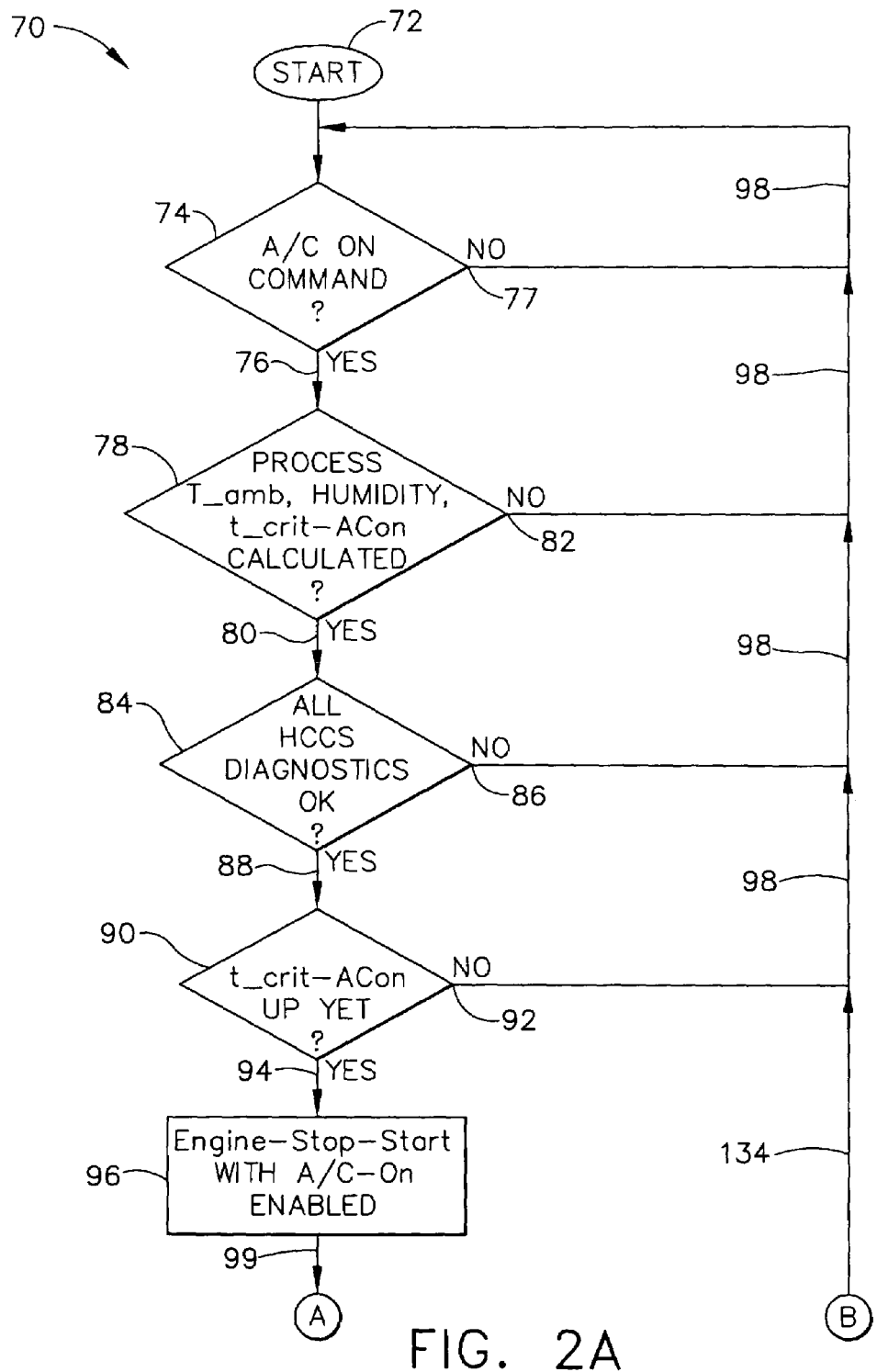
FIGS. 2A and 2B is a flow chart of a method for operating the drive train of FIG. 1 to provide vehicle cabin cooling control to the mild hybrid vehicle in accordance with an exemplary embodiment of the present invention.
Figure 2B:
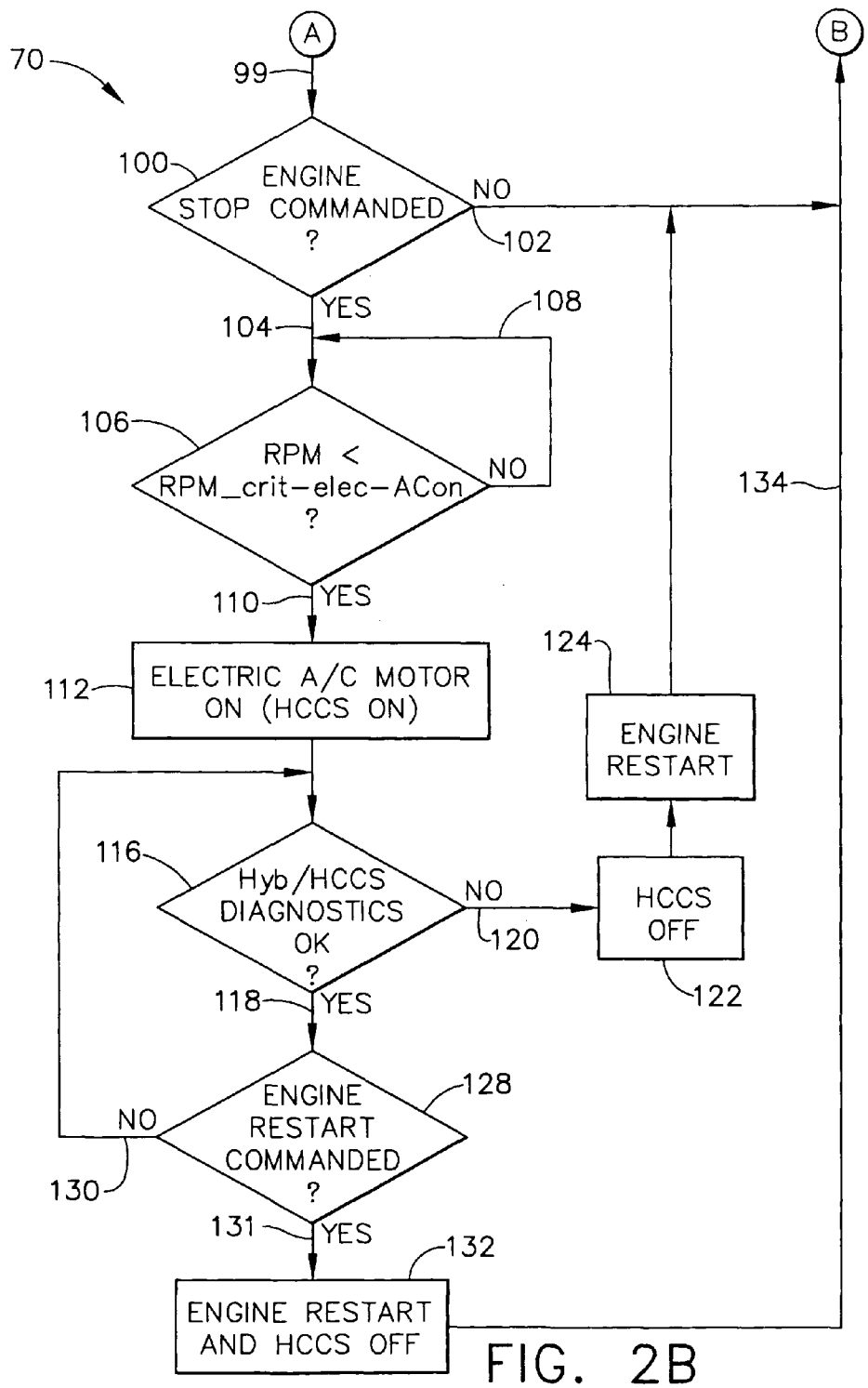

More specifically, ECM 62 preferably performs the passenger cabin cooling control method 70 of FIGS. 2a and 2b. However, any number of electronic controllers or a combination of electronic controllers can perform method 70. One of the features of HCCS method 70 is to utilize the engine 12 to power compressor 38 to draw down the cabin temperature before ESS can be activated and motor 40 can be utilized. Then only when the A/C system is in a cabin "climate maintenance mode" the ESS can be activated and the compressor 38 can possibly be driven by motor 40.

Referring to FIG. 2a it is assumed that the ECM interrupt software routine provides a signal to start 72 the HCCS method 70. In a vehicle without an automatic climate control system, the driver or passenger are solely responsible for setting the HVAC inputs 46 or parameters of line 52 of FIG. 1. These HVAC inputs include fan speed, temperature setting and whether the A/C is being requested. If the vehicle has an automatic climate control system then some of these inputs are automatically provided by such system. If an "A/C on command" has been provided then decision block 74 provides the "Yes" of line 76 rather than the "No" of line 77. Alternatively, if a "No" is provided because the "A/C on" has not been requested then the HCCS method 70 monitors block 46 of FIG. 1 until a "Yes" 76 is provided by block 74 of FIG. 2a. Assuming the "Yes" 76 is provided then ECM 62 calculates a period, "t_crit-ACon" that the compressor must be driven by engine 12 after initial start up to sufficiently cool down the passenger cabin. After t_crit-ACon engine 12 can be shut down by operation of the ESS and the drive motor 40 can then operate compressor 38 to sustain or maintain the cabin cooling in the event the ESS shuts down the engine 12. To calculate t_crit-ACon, ECM 62 utilizes parameters such as the ambient air temperature, "T_amb" from block 56 which can be estimated from intake air temperature sensor readings (not shown) or the cabin humidity which can either be measured by a humidity sensor or modeled based on front and/or rear defogger status, for instance. Based on this T_amb and A/C diagnostic data such as the high side pressure of compressor 38, ECM 62 calculates t_crit-ACon. t_crit-ACon is calculated to be long enough for the cabin to be sufficiently cooled and for large ambient temperature differences between the vehicle key-up location such as a garage and the outside street ambient temperature to not confuse ECM 62 and the associated calculation of t_crit-ACon. t_crit-ACon can be approximately ten minutes, for example. Decision block 78 provides the "Yes" of line 80 only after ECM 62 has had sufficient time to calculate t_crit-ACon. Otherwise the "No" of line 82 is provided if the time is not sufficient to calculate t_crit-ACon in which case the method 70 loops back around through blocks 74 and 78 until t_crit-ACon is calculated.

Assuming the "Yes" of line 80 then decision block 84 inquires whether the "diagnostics" are acceptable. Such diagnostics or other parameters can in effect result in an elongation of t_crit-ACon if these diagnostics are not within acceptable limits. These parameters include a low battery bank 35 state of charge (SOC) on conductor 59 of FIG. 1. Other such diagnostics include the temperatures in the hybrid system (motor, electronics, battery etc), rear window defogger on-status or hybrid system fault codes. Also, in the case of extreme high or low T_amb or extreme humidity, the ESS and/or the electric motor 40 drive to compressor 38 (elec-ACon) can be suspended by block 84 by providing the "No" of line 86.

Assuming all the diagnostics are acceptable then the "Yes" of line 88 allows decision block 90 to inquire whether t_crit-ACon is up yet. If not, then the "No" of line 92 causes the system to cycle through blocks 74, 78, 84 and 90. Alternatively, if t_crit-ACon has passed then the "Yes" of line 94 enables function block 96 to signal that the elec-ACon function can be enabled if the ESS function provides an engine 12 stop signal. Thus a "No" decision resulting from any of the decision blocks of FIG. 2a results in method 70 returning to the input of the first decision block 74 as indicated by lines 98.

Referring to FIG. 2b, decision block 100 of HCCS method 70 is connected to block 96 through line 99. Block 100 monitors the ESS system to determine whether an engine stop has been commanded. If the engine stop has not been commanded then the "No" of line 102 causes the method steps of FIG. 1a to be repeated until the "Yes" of line 104 is provided. Engine 12 can be stopped while the vehicle wheels 27 and 28 of FIG. 1 are still rolling. In a conventional AC drive system being run through the front accessory drive belt 32, the stopping of engine 12 equates to the stopping of the A/C compressor 38 cooling function. However decision block 106 of FIG. 2b triggers the elec-ACon signal of function block 112 so that the A/C compressor 38 can continue to operate in response to the engine RPM becoming less than a critical engine RPM, "RPM_crit". More specifically, decision block 106 inquires whether the engine RPM is less than RPM_crit. If not then the "No" of line 108 causes the system 10 to monitor the engine RPM through conductor 61 of FIG. 1 until the engine RPM is less than RPM_crit. In this case the "Yes" of line 110 is provided which results in disengagement of front clutch 36 and compressor motor 40 taking over the driving of compressor 38 to continue to provide cooling to the passenger compartment until engine 12 is restarted. For example if RPM_crit 171 is 400 RPM. As engine 12 is stopping from 1000 RPM and falls through 400 RPM, front clutch 36 is disengaged to decouple compressor 38 from engine 12 and the electric A/C motor 40 is activated to continue operation of compressor 38 per block 112. Thus the use of RPM_crit threshold by block 106 allows the rotational momentum of compressor 38 previously supplied by combustion power of engine 12 to result in a reduction of the electric power spike otherwise created if compressor 38 was allowed to stop rotating before power was applied to motor 40. In addition, enabling motor 40 to begin powering compressor 38 before engine 12 stops allows compressor 38 to continuously turn without coming to a stop and thereby reduce the change in vehicle noise, which may improve customer satisfaction.

After motor 40 has been energized, method 70 continues to monitor the previously mentioned parameters of the hybrid powertrain including those related to the HCCS function as indicated by decision block 116. If the parameters are within acceptable ranges then the "Yes" of line 118 is provided. If any of the parameters drift out of acceptable range then the "No" of line 120 results. Block 122 responds to the "No" of line 120 to shut down the HCCS function which results in the electrical power to motor 38 being switched off and the engine being commanded to restart as indicated by block 124.

Alternatively, if all the diagnostics are within range as indicated by "Yes" 118, then decision block 128 monitors for the ESS to provide an engine restart command. The "No" of line 130 indicates the absence of such a command and the motor 40 continues to operate compressor 38 (HCCS On). Alternatively when engine restart is commanded the "Yes" of line 131 initiates the restart of engine 12 and the termination of the power to motor 40 (HCCS Off) of function block 132. It is usually desirable for the power to be switched off to motor 40 before power is applied to MoGen 30 to reduce the draw on battery bank 35 of FIG. 1 during the engine restart process. As indicated by lines 134 the method 70 is then reset to the input of block 74 in response to the engine restart signal of either of blocks 124 or 132.

Many modifications of method 70 will occur to those skilled in the art. For instance, if there are diagnostic warnings from the sensor codes such as low battery state of charge, the A/C operation can be momentarily suspended to give the highest priority to engine 12 restart. Still another modification could involve the A/C high side pressure. More particularly if the A/C high side pressure is approaching a higher than a desirable value, the HCCS function can be suspended and the A/C condenser cooling fan can be turned on. Similarly, if a humidity sensor is implemented, above a calibrated humidity value, the HCCS system can be suspended to let the engine provide the high power air dehumidification needs. According to a further modification, if the A/C load is low, the ESS function can be enabled without enabling the HCCS function. In this case when the engine is stopped, the A/C compressor 38 would also stop. The compressor capacity can be increased for some time before engine shutdown (e.g., during deceleration) to further decrease the evaporator temperature. This operation is most applicable in a vehicle with an automatic climate control in a state where the compressor 38 was not energized or at low capacity because the cabin temperature is within a desired range. Per an additional modification, if the remainder of the hybrid powertrain systems are fully functional and the ambient temperature, blower setting and/or humidity are within calibrated ranges, the ESS functions could still be enabled. In this case, the A/C compressor motor 40 would be either disabled if running or not energized if not running. Moreover, after a calculated engine stop time has passed or a higher A/C request from a vehicle user, the engine 12 would be restarted to directly operate the compressor 38.

Figure 3:
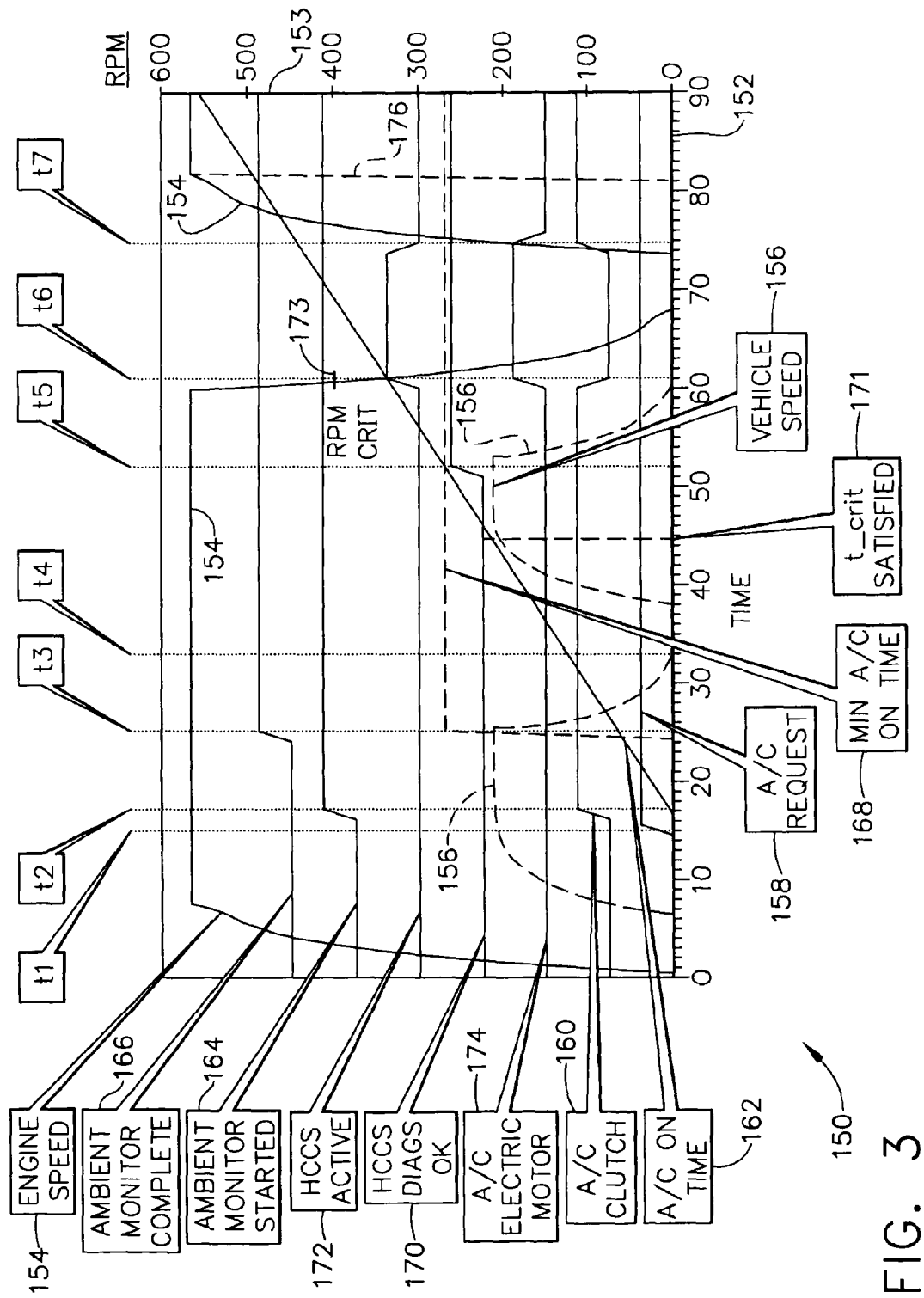
FIG. 3 is a timing diagram for illustrating the method of FIG. 2 in accordance with an exemplary embodiment of the present invention.

FIG. 3. shows a timing diagram 150 illustrating an example of the operation of one embodiment of the method 70. Abscissa axis 152 measures time and ordinate axis 153 measures the amplitudes of the various graphs of FIG. 3. The engine speed is represented by graph 154 in RPM along axis 153. Prior to time t1, it is assumed that the vehicle engine 12 is started up in a cool garage on a hot summer day. The engine speed 154 then rapidly rises from 0 RPM to about 580 RPM. The vehicle speed represented by dashed graph 156 increases from 0 miles per hour (mph) to a non-zero level near time t1. An A/C request or command 74 of FIG. 2a is made at about time t1 as shown by the change in level of graph 158 of FIG. 3. As a result, A/C clutch 36 represented by the change in level of graph 160 engages at time t2 to allow the engine 12 to start turning compressor 38 thereby starting the A/C on time of graph 162.

In addition, the ambient parameter monitor enables the calculation process of block 78 of FIG. 2a to begin at time t2 as represented by the change in level of graph 164. The calculation of t_crit-ACon by block 78 is completed at about time t3 as indicated by the change in level of graph 166. Moreover the "Min A/C On Time" of graph 168 begins just before time t3. More particularly, the change in level of graph 168 at about time t3 also indicates that the t_crit-ACon threshold has been calculated per block 78 for FIG. 2a. The minimum A/C on time expires when graph 162 A/C on time crosses graph 168 at time t5.

The vehicle speed 156 returns to zero mph at time t4 and then returns to its former level before time t5. Time t4 shows that although the vehicle came to a stop, the HCCS 170 is not enabled because t_crit-ACon has not expired yet. At time t5 the diagnostics as indicated by the change in level of graph 170 are determined to be within their acceptable ranges per block 84 of FIGS. 2a and t_crit-ACon is up or has passed 171 per block 90 of FIG. 2a. Hence, the "engine stop with A/C-On enabled" of block 96 occurs at time t5.

Immediately prior to time t6 an engine stop is commanded which causes the engine speed of graph 154 to fall below the RPM-crit level 173 of approximately 400 RPM at time t6 of block 106 of FIG. 2b. As a result, the front clutch 38 disengages the compressor 38 from the engine 12 as indicated by the level change of graph 160 at time t6. The "HCCS On" operation of block 112 of FIG. 2b as represented by graph 172 is also activated and the A/C electric drive motor 40 is powered up as represented by the change in level of graph 174 at time t6. Thus compressor 38 is driven by motor 40 to continue to deliver cooling to the passenger cabin and the A/C On Time of graph 162 continues to ramp up.

Immediately before time t7 either an engine restart is commanded or a parameter falls out of range. In either case, block 128 of FIG. 2b causes the HCCS to turn off as indicated by the change in level of graph 172 to make available ample electric power to the MoGen for engine start. Accordingly electric motor 140 turns off at time t7 as shown by the change in level of graph 174. In addition, front clutch 38 engages coincidentally with motor 40 shutting down as shown by graph 160 and 174. Clutch 38 again enables the engine 12 to drive compressor 38 after the engine speed has stabilized 176, near 82 units on time scale 152. Alternatively, if the battery state of charge is sufficiently high, the HCCS motor remains powered until the engine speed has stabilized after engine restart. This allows a smoother engagement of front clutch 38. Thus the A/C continues to be provided as indicated by graph 162 continuing to ramp up. Hence the A/C on function of graph 162 continues to ramp at the same slope without interruption even though engine 12 is stopped and restarted.

In view of the foregoing, it should be appreciated that there has been provided an exemplary HCCS method 70 and apparatus 10 which provides a simple, efficient and economical motor vehicle passenger cabin climate cooling control system for use in hybrid and mild hybrid electric vehicles. Such system 10 and method 70 require a minimum parts count and parts mass for powering the A/C compressor 38 when the gasoline engine 12 is temporarily inoperative because of the operation of ESS, for instance. Moreover, the system 10 and the method 70 ensure that the vehicle driveability is consistent, predictable and pleasing to the customer while maintaining fuel efficiency and emissions reductions.

While the exemplary embodiments have been presented in the foregoing detailed description, it should be appreciated that a vast number of variations exist. It should also be appreciated that these exemplary embodiments are only examples, and are not intended to limit the scope, applicability, or configuration of the invention in any way. Rather, the foregoing detailed description provides those skilled in the art with a convenient road map for implementing an exemplary embodiment of the invention. It being understood that various changes may be made in the function and arrangement of elements described in an exemplary embodiment without departing from the spirit and scope of the invention as set forth in the appended claims.

The invention claimed is:

1. A method for providing climate cooling to the passenger cabin of a motor vehicle having an internal combustion engine that is selectively started and temporarily stopped, such method comprising the steps of:
sensing selected parameters associated with said motor vehicle;
responding to said selected parameters to selectively operate a compressor motor to thereby operate a compressor when said engine is temporarily stopped so that the climate cooling continues to be supplied to the passenger cabin while the engine is temporarily stopped;
sensing whether cabin cooling is being requested;
if cabin cooling is requested then calculating a period for the engine to directly operate the compressor;
utilizing the engine to operate said compressor for said time period to cool the cabin temperature during said time period;
providing a first control signal when said time period has elapsed, said first control signal allowing the engine to be temporarily stopped and the compressor motor to be operated so that the compressor can provide additional cabin cooling when said engine is temporarily stopped;
sensing when an engine stop is commanded;
monitoring the engine revolutions per minute as the engine is stopping;
providing a second control signal when the engine revolutions per minute fall below a predetermined threshold;
utilizing said second control signal to activate said compressor electric motor;
sensing diagnostics parameters associated with the vehicle;
determining whether said diagnostic parameters are within acceptable limits; and
providing said second control signal only if said diagnostic parameters are within acceptable limits.

2. The method of claim 1 wherein said engine is restarted if said diagnostic parameters are not within said acceptable limits.

3. The method of claim 1 wherein said diagnostic parameters include hybrid system fault codes.

4. The method of claim 1 further including the steps of:
monitoring whether an engine restart is commanded;
terminating the operation of said compressor motor in response to said engine restart command;
restarting said engine in response to said engine restart command; and
utilizing said engine to operate said compressor.

* * * * *